(12) United States Patent
Touwslager et al.

(10) Patent No.: US 8,861,068 B2
(45) Date of Patent: Oct. 14, 2014

(54) DISPLAY STRUCTURE WITH A ROUGHENED SUB-ELECTRODE LAYER

(75) Inventors: Fredericus Johannes Touwslager, Eindhoven (NL); Erik Van Veenendaal, Eindhoven (NL); Kevin Michael O'Neill, Eindhoven (NL); Monica Johanna Beenhakkers, Eindhoven (NL)

(73) Assignee: Creator Technology B.V., Breda (NL)

( * ) Notice: Subject to any disclaimer, the term of this patent is extended or adjusted under 35 U.S.C. 154(b) by 70 days.

(21) Appl. No.: 13/003,163

(22) PCT Filed: Jul. 7, 2009

(86) PCT No.: PCT/NL2009/050403
§ 371 (c)(1),
(2), (4) Date: Mar. 29, 2011

(87) PCT Pub. No.: WO2010/005299
PCT Pub. Date: Jan. 14, 2010

(65) Prior Publication Data
US 2011/0181811 A1    Jul. 28, 2011

Related U.S. Application Data

(60) Provisional application No. 61/078,678, filed on Jul. 7, 2008.

(51) Int. Cl.
  *G02B 26/00*    (2006.01)
  *G02F 1/07*    (2006.01)
  *G02F 1/1343*    (2006.01)

(52) U.S. Cl.
  CPC .................................. *G02F 1/13439* (2013.01)
  USPC .......................................... 359/296; 359/245

(58) Field of Classification Search
  USPC .......... 359/245, 265, 290–292, 295, 298, 296
  See application file for complete search history.

(56) References Cited

U.S. PATENT DOCUMENTS

| 6,038,008 | A | 3/2000 | Kim et al. |
| 6,415,653 | B1 * | 7/2002 | Matsuyama ..................... 73/105 |
| 2004/0027339 | A1 * | 2/2004 | Schulz ........................... 345/173 |
| 2004/0223207 | A1 * | 11/2004 | Warner et al. ................. 359/265 |
| 2007/0139358 | A1 | 6/2007 | Sakamoto |
| 2008/0176490 | A1 * | 7/2008 | Sasaki et al. .................... 451/51 |

FOREIGN PATENT DOCUMENTS

| CN | 1469800 A | 1/2004 |
| CN | 1983006 A | 6/2007 |
| WO | WO 97/38348 A1 | 10/1997 |

OTHER PUBLICATIONS

Schmitt Measurement Systems, Inc., "Roughness Average, Ra," Internet Article [Online]; Nov. 15, 2000 URL: www.schmitt-ind.com/pdf/Roughness.pdf [retrieved on Sep. 22, 2009].
International Search Report for PCT/NL2009/050403 dated Oct. 13, 2009.

\* cited by examiner

*Primary Examiner* — William Choi

(57) ABSTRACT

The invention relates to a display structure comprising an electrode layer (3) superposed on a sub-layer (5) wherein a surface of the sub-layer facing the electrode layer is roughened. In particular, the display structure may relate to a TFT stack comprising a layer of an electrode metal corresponding to a pixel electrode (3). The pixel pad together with the data line (1) is used for charging of the pixel pad. The gate electrode (4) used is separated from the source and drain electrode (1, 3) by a dielectric layer (6). The structural layers of the TFT may be deposited on a suitable flexible substrate (7). In order to prevent defects in the light modulating layer (9) from being visible, a surface of the sub-layer (5) underlying the electrode layer (3) is roughened. It is desirable to provide such improvement to, among others, electrophoretic-type displays and liquid crystal-type displays.

12 Claims, 3 Drawing Sheets

DISPLAY STRUCTURE WITH A ROUGHENED SUB-ELECTRODE LAYER

FIELD

The invention relates to a display structure. The invention further relates to an electronic apparatus comprising a display structure.

BACKGROUND OF THE INVENTION

An embodiment of a display structure is known from US2007/0139358. In this embodiment the display structure is a layer-stacked structure in which thin film transistor (TFT) glass substrate and an electrophoretic layer are arranged for allowing active-matrix driving of the electrophoretic display device. In the known structure the TFT electrode layers are positioned on top of a suitable sub-layer, for example for enabling due isolation in the electrode pattern.

Another embodiment of a display structure related to a flexible transflective LCD device is known from US 2006/0187385. In this embodiment the display structure comprises a first flexible structure, a second flexible structure, multiple supporting microstructures and a liquid crystal layer. In order to enable due functionality of the known display structure, it is provided with an electrode layer, which may be positioned on top of a suitable reflective plate of the transflective LCD stack.

SUMMARY OF THE INVENTION

It is a disadvantage of the known displays that a metal electrode when used as a pixel electrode material may have a property of a specular reflection. This causes an increased black level if the display material is not completely absorbing. In addition, defects which may be present in suitable light modulating layers of the display become visible, which degrades quality of the display. For example, voids, or missing capsules of an electrophoretic display may appear as gold spots, due to the fact that an underlying gold layer is visible when observed under certain viewing angles.

Having a non reflecting pixel electrode, and, preferably a light absorbing electrode may be advantageous. However, a good electrical contact between the electrode layer and a sub-layer, for example a display effect layer, must be enabled for a proper functioning of display pixels. This limits possibilities in choosing an alternative pixel electrode material.

It is an object of the invention to provide a display structure wherein defects in the light modulating layer and errors therein are substantially not visible, whereas performance of the display is not deteriorated. It is desirable to provide such improvement to, among others, electrophoretic-type displays and liquid crystal-type displays.

To this end a display structure according to the invention includes an electrode layer superposed on a sub-layer wherein a surface of the sub-layer facing the electrode layer is roughened having roughness "Ra" preferably where:

$1 < Ra < 500$ nm, and more preferably $1 < Ra < 50$ nm.

It is found that roughening a layer underneath the electrode metal layer before depositing the electrode metal may provide a black appearance of the electrode metal, which is advantageous as defects in the light modulating layer are not visible. An additional advantage of roughening the sub-layer is an increased contact surface area between the electrode metal layer and display effect layer. In electrophoretic displays the sub-layer may relate to conductive glue by means of which the display effect layer is laminated to the electrode metal layer. The increased contact surface area may result in reduced electrical resistance between the electrode metal layer and the display effect layer, and lead to a larger fraction of the applied voltage being applied across the display effect layer, which improves its operational characteristics with regard to switching properties. In particular, the display structure according to the invention may comprise pixels including thin film transistor (TFT) stacks, wherein said electrode layer and said sub-layer form part of the TFT stacks. It is found that providing the sub-layer facing the electrode layer with roughness Ra preferably $1 < Ra < 500$ nm, more preferably $1 < Ra < 50$ nm, may effectively provide a sought black appearance of the electrode metal.

It will be appreciated that the display structure according to the invention may be used in either passive matrix displays or in active matrix displays. Preferably, the active matrix comprises a suitable plurality of thin film transistors (TFT's). The sub-layer under the electrode layer may be suitably roughened using etching or by means of replication, for example using embossing.

In an embodiment of the display structure according to the invention the sub-layer comprises an organic material. Preferably, the organic material is insulating and thus yielding an organic insulator layer.

It is found to be particularly easy to implement the invention in the organic TFT, as the sub-layer may be easily etched prior to deposition of the electrode metal layer. Preferably, organic polymers are used in the TFT stack. In particular embodiments the organic polymers are flexible, which enables fabrication of a flexible display. An active matrix TFT stack will be discussed in more detail with reference to FIG. 1.

In a particular embodiment of the display structure according to the invention, the pixels comprise electrophoretic material.

Electrophoretic material is known in the art and it may be particularly advantageous to implement the invention in the field of flexible displays. In particular, it is preferable to keep a total thickness of the flexible display as thin as possible for preventing display damage due to stress during deformation of the display. In accordance with the invention the problem of visible defects in the light modulating layer is solved, yet the total thickness of the flexible display is not altered. The light modulating layer may relate at least to electrophoretic displays or to liquid crystal displays, such as liquid crystal (LC), polymer dispersed liquid crystal (PDLC), or cholesteric liquid crystal (ChLC) display. An electrophoretic display will be discussed in more detail with reference to FIG. 2.

The invention further relates to an electronic apparatus comprising a display structure as is discussed with respect to the foregoing. The electronic apparatus may relate to any display-based electronic device, like a mobile phone, an organizer, a palmtop computer, or the like. The electronic apparatus may comprise a flexible electronic display, which may be arranged to be rolled up upon storage. Alternatively, the electronic apparatus may comprise a wrappable display, which may be wrapped about a suitable item, for example, a housing of the electronic apparatus, upon storage.

The invention still further relates to a method of manufacturing a display structure comprising an electrode layer superposed on a sub-layer, the method comprising the steps of:

roughening a surface of the sub-layer facing the electrode layer, and depositing the electrode layer on the roughened sub-layer.

Preferably, roughness (Ra) of the sub-layer is in a range such as: $1 < Ra < 500$ nm, and preferably $1 < Ra < 50$ nm. In accordance with the invention a display structure is provided with an improved display quality, in particular in relation to visibility of defects, voids and such. It is found that by roughening the sub-layer underlying the gold layer a decrease of reflectivity of the sub-layer may be about a factor of 10. For obtaining desired roughening a plurality of state of the art methods may be used. Preferably, the sub-layer is etched or replicated, for example embossed. These methods have an advantage of being relatively inexpensive processing steps.

These and other aspects of the invention will be discussed in more detail with reference to drawings wherein like reference signs represent like elements. It will be appreciated that the drawings are presented for illustrative purposes only and may not be used for limiting the scope of the appended claims.

DETAILED DESCRIPTION OF THE DRAWINGS

Figure 1:
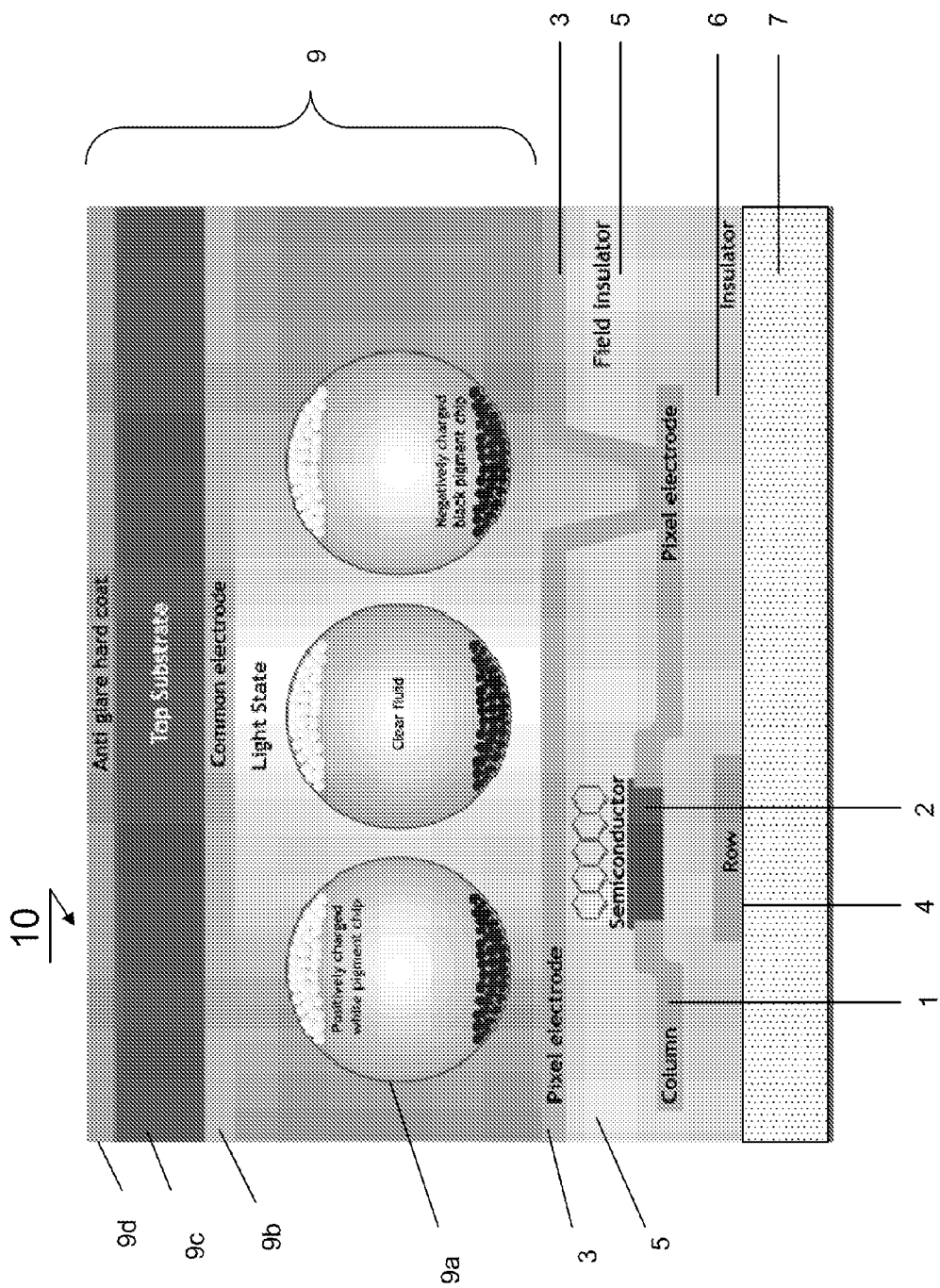
FIG. 1 presents a schematic view of an embodiment of a display structure according to the invention.

FIG. 1 presents a schematic view of an embodiment of a display structure according to the invention. The display 10 may comprise two parts. A first part may relate to the active-matrix back plane containing suitable thin-film transistors (TFT's), based on a suitable semiconductor material 2 for example, polymer electronics TFTs. The second part may relate to a display effect layer 9, which may be laminated on top of the back plane. Preferably, the display effect layer 9 is laminated on the back plane using conductive glue. More preferably, the display effect layer 9 is based on capsules comprising electrophoretic material 9a. An embodiment of an electrophoretic capsule will be discussed with reference to FIG. 2.

FIG. 1 schematically shows a view of a back plane comprising a TFT stack as may be used in a display structure according to the invention. The TFT stack comprises a layer of an electrode metal corresponding to a pixel electrode 3. The electrode layer together with a data line 1 is used for charging of the pixel electrode. The gate electrode 4 is separated from the source and drain electrode 1, 3, respectively, which are positioned in contact with the semiconductor 2 by a dielectric layer 6. The structural layers of the TFT may be deposited on a suitable flexible substrate 7.

The display structure 10 may comprise a suitable plurality of the thus formed TFTs, which may be connected to each other by gold soldering. In accordance with the invention, in order to prevent defects in the light modulating layer 9 from being visible, a surface of the sub-layer 5 underlying the electrode layer 3 is roughened, having roughness Ra preferably in the following range 1<Ra<500 nm, and more preferably in the range 1<Ra<50 nm. The light modulating layer 9 may comprise a layer of electrophoretic material 9a followed by a common electrode layer 9b and supplemented with a top substrate 9c and an anti-glare coating 9d.

In order to control the image content of the display structure 10, a suitable voltage altering the TFTs from a non-conducting to a conducting state may be applied during a part of one frame time for all rows. In this line selection time, pixel capacitors (i.e. the total capacitance at the drain side of the TFT) of the selected row may be charged to the voltage supplied on the column electrodes. During the remaining frame time (i.e. the hold time) the other rows may be addressed. The TFTs are then in their non-conducting state and the charge on the pixel capacitors must be retained.

Figure 2:
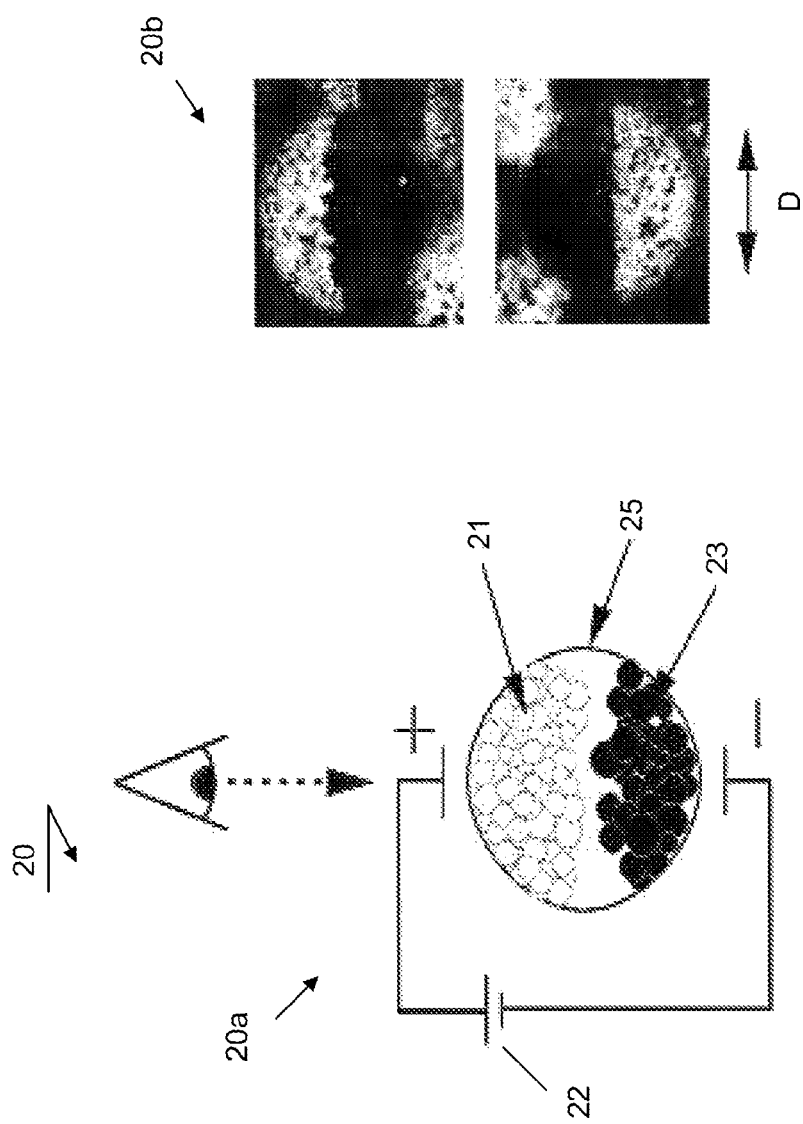
FIG. 2 presents a schematic view of an electrophoretic capsule.

FIG. 2 presents a schematic view of an electrophoretic capsule. Item 20a schematically illustrates an embodiment of an electrophoretic capsule 20 comprising white particles 21 and black particles 23 encapsulated in a suitable body 25. Preferably, the body 25 is square-shaped, although other geometries, like spherical shape, may be used. Respective movement of the white and black particles in the body 25 is controlled by applying a suitable voltage from a source 22. As has been indicated earlier, the TFT's positioned at corresponding display pixels are used to apply suitable voltage to the bodies 25 for black/white or grey switching. Item 20b shows a photograph of an electrophoretic capsule, wherein a diameter of the capsule D is about 20-40 µm.

In order to suitably change image content on the electrophoretic display 10, the new image information may be written for a certain amount of time, for example during a period of 500 ms-1000 ms. As the refresh rate of the active-matrix is usually higher this results in addressing the same image content during a number of frames. For example, at a frame rate of 50 Hz, 10 to 50 frames long. A schematic drawing of the electrophoretic principle with capsule photographs in the white and the black state are shown in item 20b. Addressing of the electrophoretic capsule from black to white, for example, requires the pixel capacitors to be charged to −15 V during 200 ms to 1000 ms. During this time the white particles drift towards the top (common) electrode, while the black particles drift towards the bottom (active-matrix back plane) electrode. Switching to black requires a positive pixel voltage and when 0 V is applied on the capsules no switching action takes place.

A typical diameter of the electrophoretic capsules is, for example, in the order of 20-40 µm. So, clustering of non-functional or missing capsules leads to defects of at least 60-80 µm. In defects with a size of >5000 µm$^2$ the underlying metallic pixel electrode may be clearly visible, for example as gold spots. A large number of defects much smaller than 5000 µm$^2$ may result in a gold sheen.

For polymer electronics active-matrix back planes with electrophoretic capsules the typical voltages may be, for example, a row select voltage of −25 V, a row non-select voltage of +25 V, a column voltage between −15 V and +15 V and a common electrode voltage of 2.5 V. These are relatively high voltages, due to the high voltage electrophoretic display effect and the fact that polymer electronics devices have to be driven at somewhat higher voltages compared to amorphous silicon devices. The advantage of using electrophoretic capsules as the display effect instead of LC material is that such capsules are bi-stable. Addressing is therefore only necessary during an image update (~1 sec), while the active-matrix is at rest between image updates.

Figure 3:
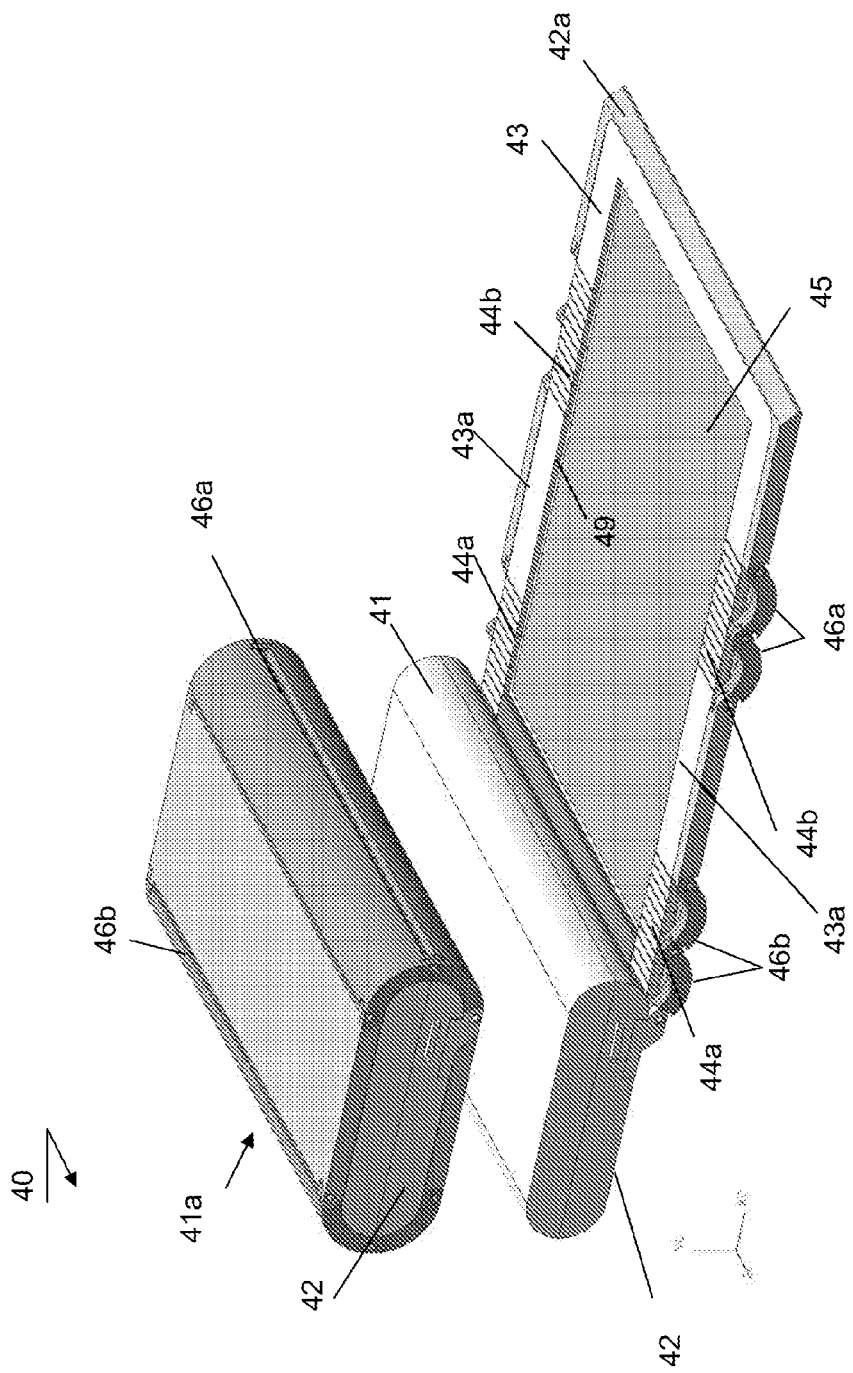
FIG. 3 presents a schematic view of en electronic apparatus according to the invention.

FIG. 3 presents a schematic view of an electronic apparatus according to the invention. The electronic device 40 may comprise a housing 42 and a retractable, notably wrappable, display 45, preferably arranged on a rigid cover 42a. The display 45 is provided with the TFT stack as is described with reference to the foregoing. The display 45 may be arranged in accordance with the embodiment described with reference to FIG. 1. The rigid cover 42a may be arranged to be wound together with the display 45 around the housing 42 to a position 41a. The rigid cover 42a may comprise an edge member 43 provided with rigid areas 43a and flexible areas 44a, 44b cooperating with hinges 46a, 46b of the cover 42a. When the display 45 is being retracted to the position wound about the housing 42, the surface of the display 45 may abut the housing 42. It will be appreciated that instead of a wrappable display the electronic apparatus may comprise a rollable display, so that the flexible display 45 is arranged to be rolled over a suitable roller upon storage, preferable inside a portion of a housing.

It will be appreciated that although specific embodiments of the display and the electronic apparatus according to the invention are discussed separately for clarity purposes, interchangeability of compatible features discussed with reference to isolated figures is envisaged. While specific embodiments have been described above, it will be appreciated that the invention may be practiced otherwise than as described. The descriptions above are intended to be illustrative, not limiting. Thus, it will be apparent to one skilled in the art that modifications may be made to the invention as described in the foregoing without departing from the scope of the claims set out below.

The invention claimed is:

1. A display structure comprising: an electrode layer superposed on a sub-layer comprising an organic material,
   wherein the sub-layer is superposed on a substrate, a surface of the sub-layer facing the electrode layer is roughened, and roughness (Ra) of the sub-layer is in a range $1<Ra<500$ nm.

2. The display structure according to claim 1, wherein the display structure comprises pixels including thin film transistor (TFT) stacks, wherein said electrode layer and said sub-layer form part of the TFT stacks.

3. The display structure according to claim 2, wherein the TFT stacks are arranged for switching respective pixels.

4. The display structure according to claim 2, wherein pixels comprise an electrophoretic material.

5. The display structure according to claim 1, wherein the sub-layer is an electrical insulator layer.

6. The display structure according to claim 1, comprising a cholesteric LC effect display effect layer.

7. The display structure according to claim 1, adapted for forming a flexible display.

8. The display structure of claim 1 wherein the roughness (Ra) is in a range $1<Ra<50$ nm.

9. An electronic apparatus comprising a display structure, the display structure comprising:
   an electrode layer superposed on a sub-layer comprising an organic material,
   wherein the sub-layer is superposed on a substrate, a surface of the sub-layer facing the electrode layer is roughened, and roughness (Ra) of the sub-layer is in a range $1<Ra<500$ nm.

10. A method of manufacturing a display structure comprising an electrode layer superposed on a sub-layer comprising an organic material, the method comprising the steps of:
    forming the sub-layer on a substrate,
    roughening a surface of the sub-layer facing the electrode layer, and roughness (Ra) of the sub-layer is in a range $1<Ra<500$ nm, and
    depositing the electrode layer on the roughened sub-layer.

11. The method according to claim 10, wherein etching or replication is used for roughening the sub-layer.

12. The method according to claim 10, wherein roughness (Ra) of the sub-layer is in a range $1<Ra<50$ nm.

\* \* \* \* \*